(12) United States Patent
Matsuda et al.

(10) Patent No.: US 7,365,732 B2
(45) Date of Patent: Apr. 29, 2008

(54) DISPLAY DEVICE EMPLOYING ELECTROPHORETIC MIGRATION

(75) Inventors: Yojiro Matsuda, Kanagawa (JP); Etsuro Kishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 962 days.

(21) Appl. No.: 10/436,344

(22) Filed: May 12, 2003

(65) Prior Publication Data

US 2003/0214479 A1 Nov. 20, 2003

(30) Foreign Application Priority Data

May 13, 2002 (JP) ............................. 2002-137117

(51) Int. Cl.
*G09G 3/34* (2006.01)
(52) U.S. Cl. ........................................ 345/107; 345/60
(58) Field of Classification Search ................ 345/107, 345/60
See application file for complete search history.

(56) References Cited

U.S. PATENT DOCUMENTS

| | | | | |
|---|---|---|---|---|
| 3,612,758 A | 10/1971 | Evans et al. | ............ | 178/5.4 R |
| 5,912,652 A * | 6/1999 | Seo | .............................. | 345/60 |
| 6,724,521 B2 * | 4/2004 | Nakao et al. | ............... | 359/296 |
| 2001/0030639 A1* | 10/2001 | Goden | ........................ | 345/107 |

* cited by examiner

*Primary Examiner*—Sumati Lefkowitz
*Assistant Examiner*—Tammy Pham
(74) *Attorney, Agent, or Firm*—Fitzpatrick, Cella, Harper & Scinto

(57) ABSTRACT

An electrophoretic display device includes a first substrate and a second substrate disposed opposite each other, a dielectric liquid filled in a gap between the first substrate and the second substrate, a plurality of charged electrophoretic particles dispersed in the dielectric liquid, a first electrode and a second electrode disposed on the first substrate to define a pixel, a partition wall disposed on at least one of the first substrate and the second substrate between adjacent pixels to prevent migration of the charged electrophoretic particles between the adjacent pixels, and a third electrode disposed adjacent to the partition wall. The charged electrophoretic particles migrate at least between a surface of the first electrode and a surface of the second electrode, and between the surface of the first electrode and a side surface of the partition wall where the third electrode is disposed to thereby switch displays.

21 Claims, 13 Drawing Sheets

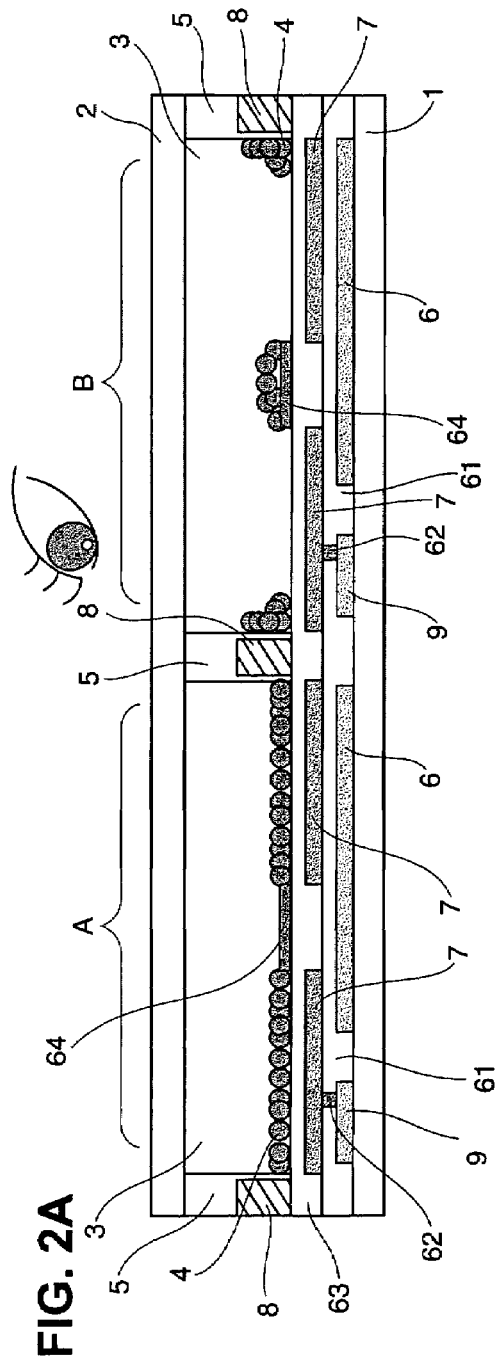
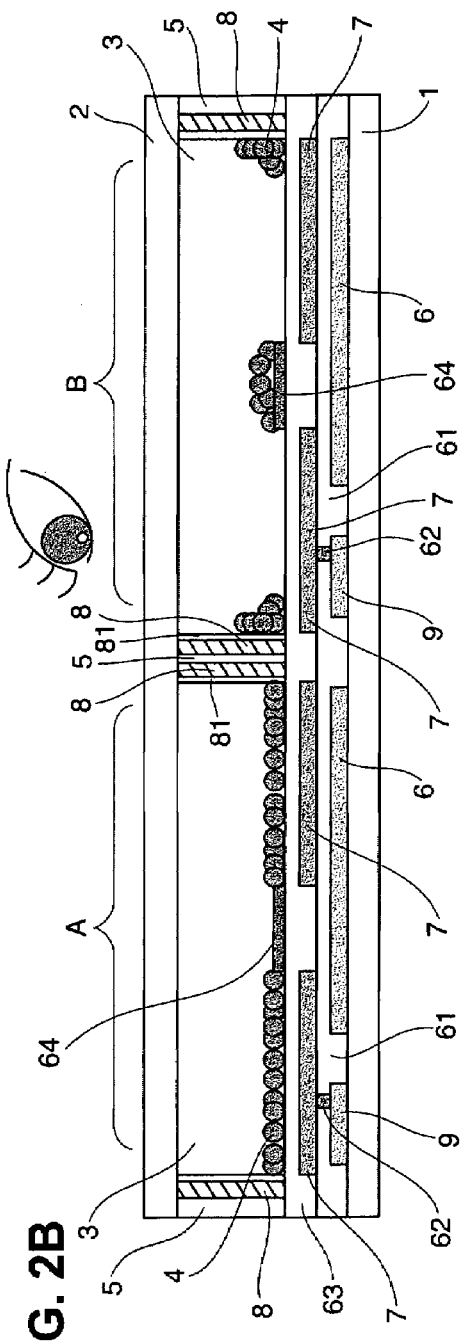
FIG. 2A
FIG. 2B

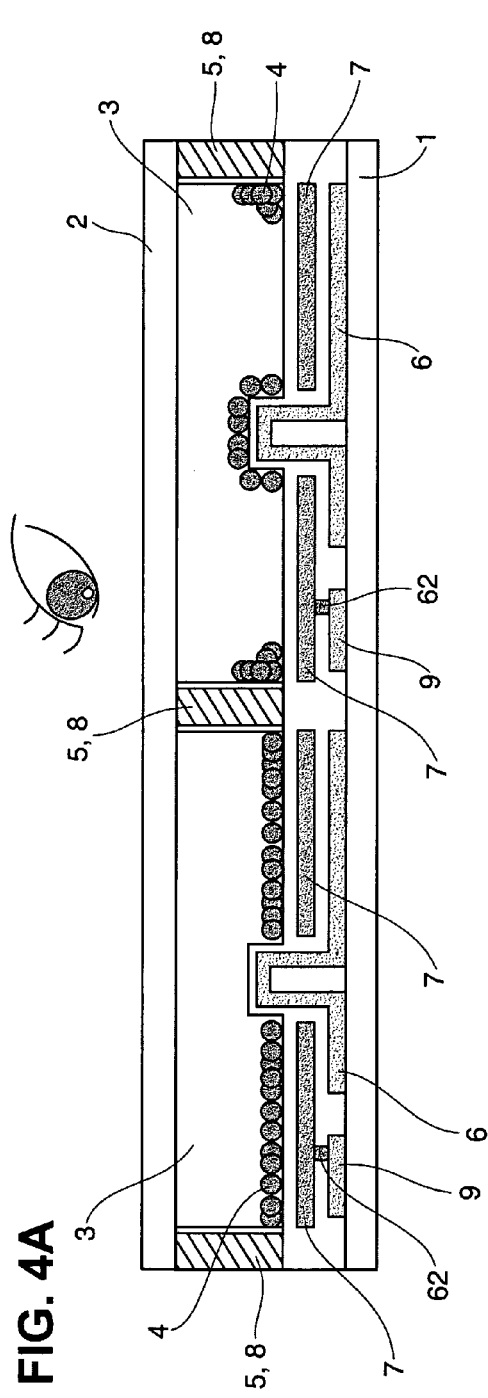
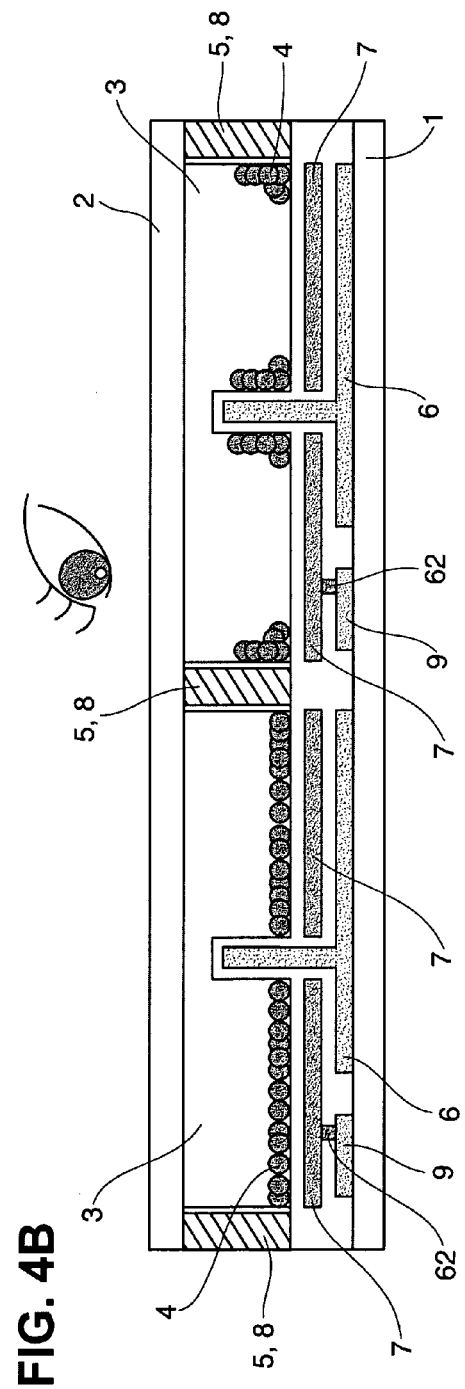

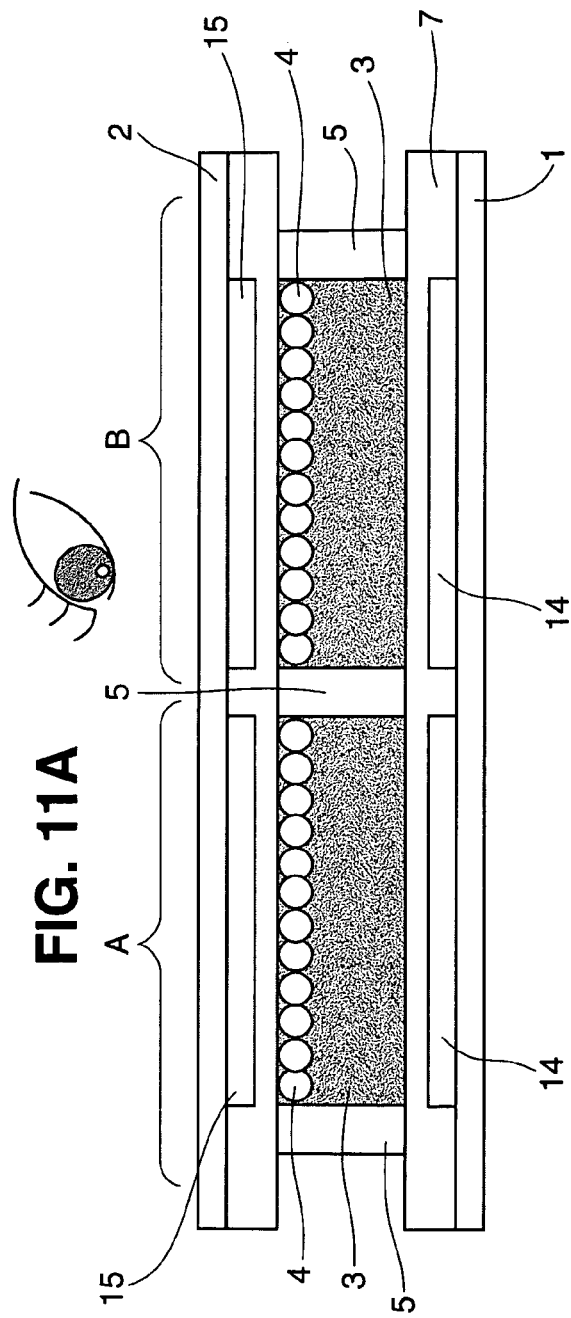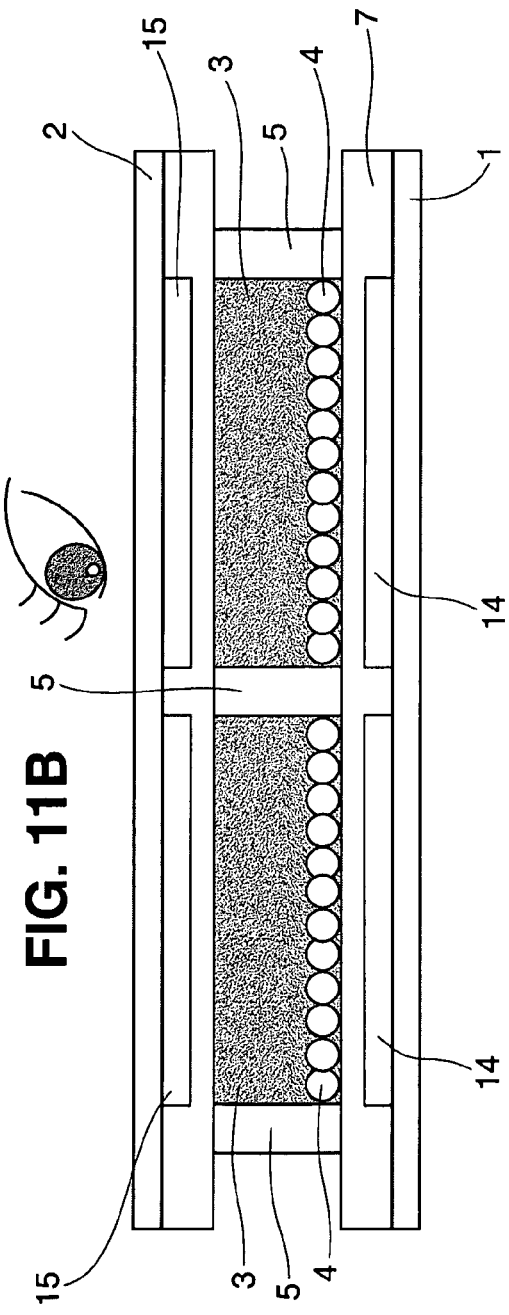

DISPLAY DEVICE EMPLOYING ELECTROPHORETIC MIGRATION

BACKGROUND OF THE INVENTION

1. Field of the Invention

The present invention relates to an electrophoretic display device wherein images or patterns are formed on the display device by electrophoretic migration of charged particles.

2. Related Background Art

The amount of information that can be handled by each individual is rapidly increasing due to the remarkable advancement in the digital technology. Along with this tendency, thin display devices with low power consumption as information output devices have been extensively developed.

As one of such display devices, an electrophoretic display device is described by Harold D. Lee et al in U.S. Pat. No. 3,612,758. FIG. 11 shows an example of a structure of the electrophoretic display device. The electrophoretic display device of this type is equipped with a pair of substrates 1 and 2 disposed opposite each other with a predetermined gap provided between the substrates 1 and 2, a dielectric liquid 3 filled in the gap between the substrates 1 and 2, numerous colored charged electrophoretic particles 4 dispersed in the dielectric liquid 3, and electrodes 14 and 15 disposed at respective pixels Λ along the substrates 1 and 2, respectively. In this device, the colored charged electrophoretic particles 4 are charged in a positive polarity or a negative polarity, such that the colored charged electrophoretic particles 4 are attracted to the electrodes 14 or to the electrodes 15 when a voltage is applied to the electrodes 14 or the electrodes 15 depending on the polarity of the voltage applied. Since the dielectric liquid 3 and the colored charged electrophoretic particles 4 are colored differently from one another, when the colored charged electrophoretic particles 4 are attracted to the electrodes 15 on a viewer's side, the color of the particles 4 can be visually recognized by the viewer (see FIG. 11(a)); and when the colored charged electrophoretic particles 4 are attracted to the electrodes 14 on the opposite side, the color of the dielectric liquid 3 can be visually recognized (see FIG. 11(b)). Accordingly, by controlling the polarity of the applied voltage for each of the pixels, various images can be displayed. Hereafter, the device of the type described above shall be referred to as a "vertical migration type."

In the vertical migration type electrophoretic display device, the dielectric liquid needs to be colored by adding and mixing coloring agents such as pigments, ions or the like in the liquid. By so doing, transfer of charges occur due to the coloring agents, which adversely affects electrophoretic movements of the charged electrophoretic particles, and deteriorates the service life and stability of the display device. Also, when the dielectric liquid is colored, the pigments in the dielectric liquid are adsorbed in the charged electrophoretic particles, which results in a problem of lowered display contrast. Furthermore, the colored dielectric liquid may enter a gap between the colored charged electrophoretic particles 4 and the electrodes 15, which lowers the display contrast.

To solve the problems described above, an electrophoretic display device of the type shown in FIG. 12 has been proposed. The electrophoretic display device shown in FIG. 12 is equipped with a pair of first substrate and second substrate disposed opposite each other with a predetermined gap provided between them, a dielectric liquid filled in the gap between these substrates, numerous charged electrophoretic particles dispersed in the dielectric liquid, and a pair of first electrode 11 and second electrodes 12 disposed at each pixel. In this display device, the pair of first electrode 11 and second electrodes 12 are not disposed in such a way to sandwich the dielectric liquid like the vertical migration type electrophoretic display device described above. Instead, the first electrode 11 is disposed along the first substrate, and each of the second electrodes 12 is formed in area that is shielded by a shield layer 13 provided on the second substrate. Also, a colored layer in a color different from that of the charged electrophoretic particles is formed at the first electrode 11, or on its surface, or in the rear of the first electrode 11 (in this case, the first electrode is transparent). When a voltage is applied to the first and second electrodes, the charged electrophoretic particles migrate depending on the polarity of the applied voltage. When the charged electrophoretic particles are attracted to the second electrodes below the shield layers, the charged electrophoretic particles are blocked by the shield layers from the viewer, such that the color of the charged electrophoretic particles cannot be seen by the viewer, and only the color of the first electrode and the shield layers can be visually recognized. On the other hand, when the charged electrophoretic particles are attracted to the first electrode, the color of the charged electrophoretic particles and the shield layers can be visually recognized. Accordingly, by controlling the polarity of the applied voltage for each of the pixels, images can be displayed.

Since the dielectric liquid in the electrophoretic display device described above may be transparent and does not need to mix with coloring agents, the problems entailed by the vertical migration type electrophoretic display device can be avoided.

However, the electrophoretic display device described above has the following problems. The electrophoretic display device shown in FIG. 12 has a structure in which the first electrode is provided flat on the first substrate, and the second electrodes are provided below the shield layers provided around the first electrode. With this structure, when a voltage is applied to the first and second electrodes to migrate the charged electrophoretic particles, it is obvious from FIG. 12 that an electric filed generated is concentrated in areas of the surface of the first electrode which are closest to the second electrodes, in other words, at end sections of the first electrode. This means that the electric field that can migrate the charged electrophoretic particles is weaker in a central area of the surface of the first electrode, which is located far from the second electrodes. For this reason, if, for example, the charged electrophoretic particles on the second electrodes are to be migrated onto the first electrode, many of the charged electrophoretic particles converge on the end sections of the first electrode, and it is difficult for the charged electrophoretic particles to reach the central area of the first electrode. Also, once the charged electrophoretic particles have moved to the central area of the surface of the first electrode, then it is difficult to migrate the particles to the second electrodes, and the charged electrophoretic particles are fixedly adhered to the central area of the first electrode. As a result, this causes a major problem of lowered display contrast.

A driving voltage may be set sufficiently large so as to move the charged electrophoretic particles to the central area of the first electrode. However, by so doing, problems relating to the dielectric strength make the active matrix driving employing switching elements difficult.

Also, in view of the active matrix driving, the conventional electrophoretic display device has another problem.

As shown in FIG. 12, there is almost no area in the electrophoretic display device where the first electrode and the second electrodes overlap each other. For this reason, the electric capacity of the display panel is extremely small. As a result, when the active matrix driving employing switching elements is to be performed, a sufficiently large auxiliary electric capacity needs to be additionally formed, and the degree of freedom in designing the switching elements becomes lowered.

SUMMARY OF THE INVENTION

The present invention is provided to solve the problems described above, and relates to a novel electrophoretic display device that achieves a stable display and provides a high contrast even in a low voltage driving.

In accordance with an embodiment of the present invention, an electrophoretic display device includes: a first substrate and a second substrate disposed opposite each other; a dielectric liquid filled in a gap between the first substrate and the second substrate; a plurality of charged electrophoretic particles dispersed in the dielectric liquid; a first electrode and a second electrode disposed on the first substrate to define a pixel; a partition wall disposed on at least one of the first substrate and the second substrate between adjacent pixels to prevent migration of the charged electrophoretic particles between the adjacent pixels; and a third electrode that is disposed at least one of inside, on a side surface, on an upper surface and on a bottom surface of the partition wall, or that forms at least a part of the partition wall, wherein the charged electrophoretic particles migrate at least between a surface of the first electrode and a surface of the second electrode, and between the surface of the first electrode and a side surface of the partition wall where the third electrode is disposed to thereby switch displays.

Other objects, features and advantages of the invention will become apparent from the following detailed description taken in conjunction with the accompanying drawings.

BRIEF DESCRIPTION OF THE DRAWINGS

FIGS. 2(a), 2(b) and 2(c) show representative cross-sectional views of other examples of display devices in accordance with the present embodiment.

FIGS. 4(a) and 4(b) show representative cross-sectional views of other examples of display devices in accordance with the present embodiment.

FIGS. 11(a) and 11(b) show cross-sectional views of examples of conventional display devices.

DETAILED DESCRIPTION OF THE PREFERRED EMBODIMENTS

Figure 1:
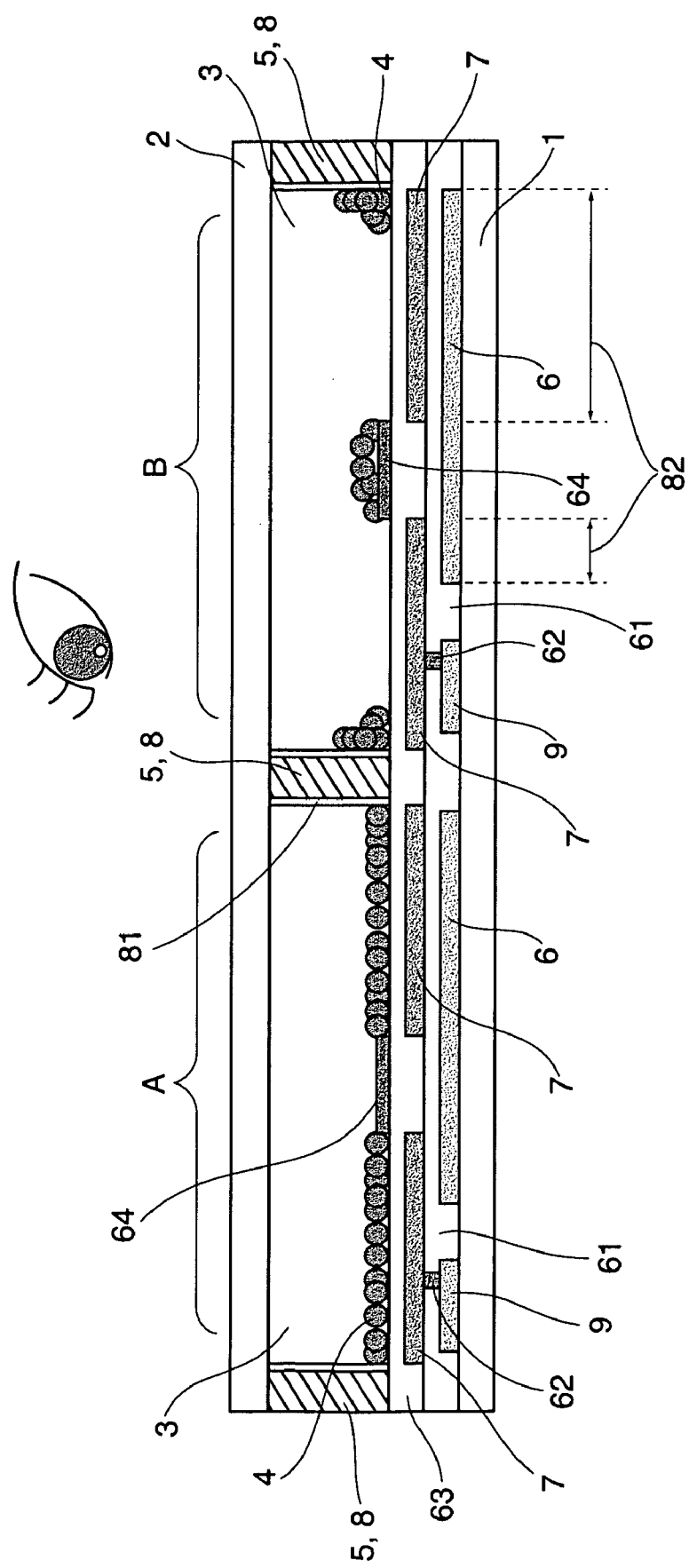
FIG. 1 shows a representative cross-sectional view of an example of a display device in accordance with one embodiment of the present invention.

A representative structure of an electrophoretic display device in accordance with an embodiment of the present invention will be described first with reference to FIG. 1. FIG. 1 shows two pixels, namely a pixel A and a pixel B. The electrophoretic display device is essentially equipped with a pair of a first substrate 1 and a second substrate 2 disposed opposite each other with a predetermined gap provided between them, partition walls 5 that provide the gap between these two substrates 1 and 2, a dielectric liquid 3 filled in a space surrounded by the substrates and the partition walls, and a plurality of colored charged electrophoretic particles 4 dispersed in the dielectric liquid. The partition walls 5 also have a function to prevent the charged electrophoretic particles 4 from migrating between the pixel A and the pixel B.

A first electrode 7, a second electrode 6 and a third electrode 8 are disposed on the first substrate 1.

When the first electrode 7 is covered by the charged electrophoretic particles 4, as shown in the case of the pixel A, the color of the charged electrophoretic particles presents the color of the pixel as displayed. When the charged electrophoretic particles 4 move to other places and an electrode surface of the first electrode 7 is exposed or can be seen, as shown in the case of the pixel B, the color of the electrode surface presents the color of the pixel as displayed. Hereafter, the first electrode may also be referred to as a display electrode.

The second electrode 6 has an area smaller than that of the first electrode 7 as viewed from the display panel surface, and functions to converge the charged electrophoretic particles, which may thus be referred hereafter to as a collector electrode.

The third electrode 6 is an electrode which is provided as a part of or an attachment to the partition wall. Hereafter, the third electrode may be referred to as a partition wall electrode. In the example shown in FIG. 1, the third electrode 6, in other words, the partition wall electrode also serves as the partition wall 5. In other words, the partition wall 5 is formed from a conductive material, and functions as an electrode. As described below, the partition wall 5 and the third electrode 6 attached thereto may be formed from independent members.

The partition wall electrode may be in one piece with the partition wall as in the case shown in FIG. 1, and may compose a part of the partition wall. Also, the partition wall electrode may be provided as an independent member inside the partition wall, on a side surface of the partition wall, on an upper surface of the partition wall, or on a bottom surface of the partition wall. Alternatively, at least a part of the partition wall electrode may be provided in an area on at least one of the first substrate and the second substrate. The partition wall electrode may preferably be provided with a dielectric layer formed on its surface for the purpose of preventing charge from injecting into electrophoretic particles. In the structure shown in FIG. 1, the partition wall electrode 8 is entirely formed with the partition wall 5 that is composed of a conductive member, and a dielectric layer 81 is formed on the surface of the partition wall electrode 8.

Each of the pixels is provided with a single collector electrode 6 or a plurality of collector electrodes 6, and the collector electrode 6 is disposed at lest in an area within the corresponding pixel that is surrounded by the partition walls 5, and at a position separated from the partition walls. Preferably, the collector electrode 6 may be disposed in a manner to include the center of the pixel and areas adjacent to the center of the pixel.

In the electrophoretic display device in accordance with the present embodiment, the charged electrophoretic particles migrate between a surface of the display electrode and a surface of the collector electrode, and/or between the surface of the display electrode and a side surface and adjacent areas of the partition wall, thereby switching displays. Among the surface of the display electrode, in areas adjacent to the partition wall, the charged electrophoretic particles migrate mainly between the surface of the display electrode and the side surface and adjacent areas of the partition wall; and in areas far from the partition wall, the charged electrophoretic particles migrate mainly between the surface of the display electrode and a surface of the collector electrode. This almost entirely eliminates a region within the pixel where the charged electrophoretic particles are difficult to migrate due to weak electric field. As a result, the driving voltage can be lowered without deteriorating the contrast.

When the pixel is in a square or a near circular shape, the collector electrode may preferably be disposed at the center of the pixel as it is effective in enhancing the strength of electric field in every direction. When the pixel is in a relatively narrow rectangular shape, two or more collector electrodes may be disposed for the pixel, such that the application voltage can be maintained at low level, and the electric field can be enhanced.

Referring to FIG. 1, when the charged electrophoretic particles 4 migrate to a position to cover the surface of the display electrode 7, the color of the charged electrophoretic particles 4 and the collector electrode 6 is visually recognized through the dielectric liquid 3 that is transparent (in the case of the pixel A in FIG. 1). When the charged electrophoretic particles 4 that cover the surface of the display electrode 7 migrate dividedly to the surface of the collector electrodes 6 and the side surface of the partition wall 5 and its adjacent areas, the color of the display electrode 7 can be visually recognized (in the case of the pixel B in FIG. 1). For example, when the charged electrophoretic particles 4 and the collector electrode 6 are black, and the display electrode 7 is white, images in black and white can be displayed (hereafter, for the convenience of explanation, it is assumed unless specified otherwise that charged electrophoretic particles and a collector electrode are black, and a display electrode is white). They are not limited to these colors and any combinations of colors can be selected optionally. Also, when a multiple-color display is desired, the charged electrophoretic particles and the collector electrode may be black; and red, green, blue, cyan, magenta and yellow color may appropriately be selected for the display electrode. The electrode may be colored by any one of the following methods:

A method in which the electrode itself is colored.

A method in which a colored layer is provided independently from the electrode.

A method in which a dielectric layer that is formed to cover the electrode is used (for example, the color of the dielectric layer itself may be used, or coloring agents may be mixed in the dielectric layer).

According to another method, charged electrophoretic particles that are colored in red, green, blue, cyan, magenta and yellow may appropriately be used to perform a color display. Next, as indicated in FIG. 1, in the electrophoretic display device in accordance with the present embodiment, a switching element 9 such as a thin film transistor for active matrix driving display may preferably be formed for each of the pixels. In addition, elements that are required for display such as wirings a driver IC around the display device may be disposed (not shown). A signal is supplied to the display electrode for each of the pixels through the corresponding switching element.

Figure 5:
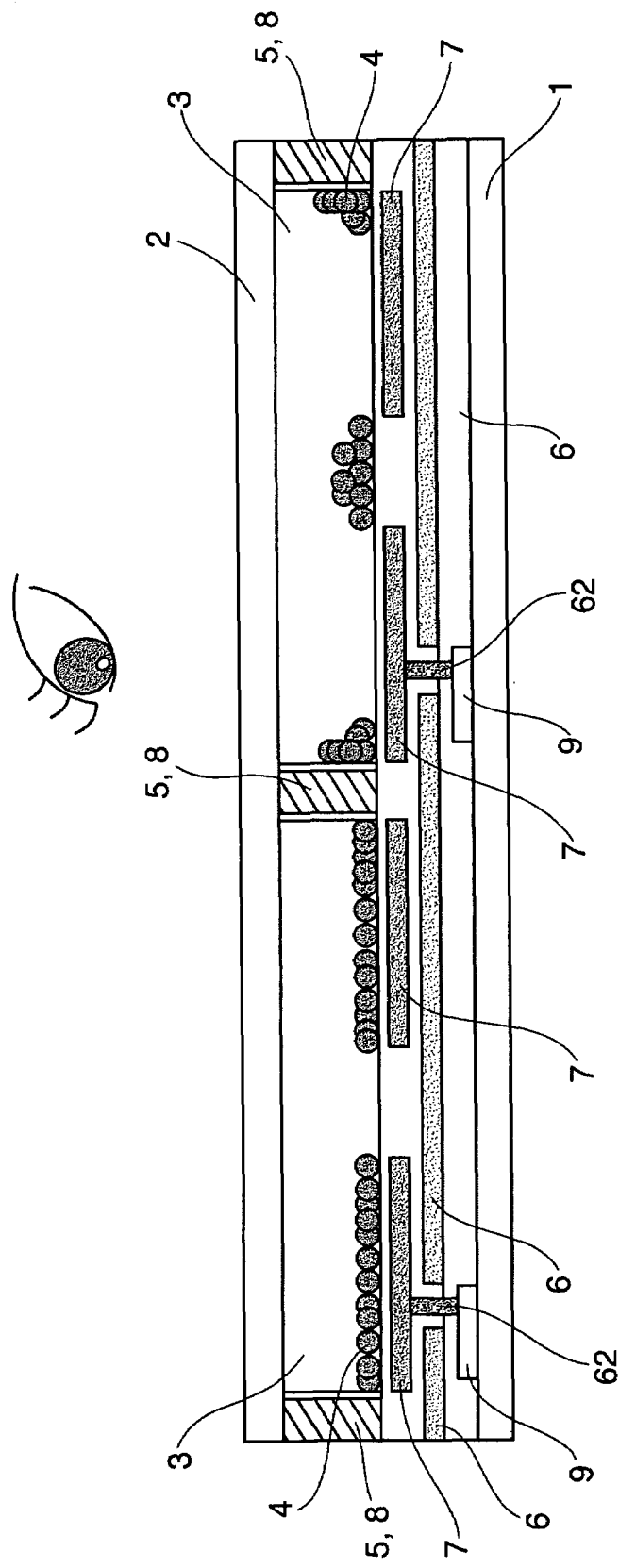
FIG. 5 shows a representative cross-sectional view of an example of a display device in accordance with another embodiment of the present invention.

When an active matrix driving is employed, the collector electrode 6 may preferably be extended longer to have regions 82 that overlap the display electrode 7. By so doing, a large electric capacity is created by the display electrode 7 and the collector electrode 6, such that a potential on the display electrode 7 can be maintained for a long time, and a predetermined electric field is maintained until the migration of the charged electrophoretic particles is completed. Unless the electrophoretic display device shown in FIG. 1, which is a horizontal migration type, has the overlapping region 82, there would be no opposing potions between the display electrode and the collector electrode, or between the display electrode and the partition wall electrode like the display device shown in FIG. 11, and therefore the electric capacity would be extremely small. By providing the overlapping portions, a relatively large electric capacity can be readily created. In the display device shown in FIG. 1, the switching element 9 and the collector electrode 6 are formed in the same layer. However, layers for forming the collector electrode and the switching element are not limited to this particular layer configuration. In an active matrix driving, the display electrode for a pixel that is turned in an off state becomes to be in an electrically float state. At this moment, if an electric capacity is formed between the display electrode 7 and the switching element 9 or a wiring (not shown) that is connected to the switching element 9, the voltage on the display electrode 7 that is in a float state is changed by the voltage applied to the switching element 9 or the wiring that is connected to the switching element 9. Accordingly, as shown in FIG. 5, the collector electrode 6 may be formed between a layer in which the display electrode 7 is formed and a layer in which the switching element 9 is formed in a manner that the collector electrode 6 shields the switching element and wirings connected to the switching element, and the collector electrode may be grounded or set at a common potential. As a result, the capacity coupling described above that may be created between the collector electrode and the switching element or the wiring connected to the switching element can be suppressed.

Furthermore, the switching element 9, the wiring (not shown) connected to the switching element 9, or wirings (not shown) connected to various electrodes, or all of the above may preferably be disposed at positions where the switching element 9 and/or the wirings are shielded by one or both of the display electrode surface and the collector electrode surface, and where they do not electrically affect the regions where the charged electrophoretic particles are present. By so doing, the influence of leak electric fields from the switching element and wirings to the charged electrophoretic particles can be suppressed.

The partition wall electrodes in accordance with the present embodiment are not limited to the structure that is provided in the electrophoretic display device shown in FIG. 1.

In the display device shown in FIG. 1, the partition wall electrode 8 that is formed from a conductive material entirely makes up the partition wall 5, and the dielectric layer 81 is formed on the surface of the partition wall electrode 8. The conductive member may be optically transparent in order to improve the viewing angle characteristic. Also, the partition wall electrode 8 that is a conductive member may not only make up the entire partition wall as indicated in FIG. 1, but may also be formed to compose a part of a lower portion of the partition wall as indicated in FIG. 2(a).

Figure 2C:
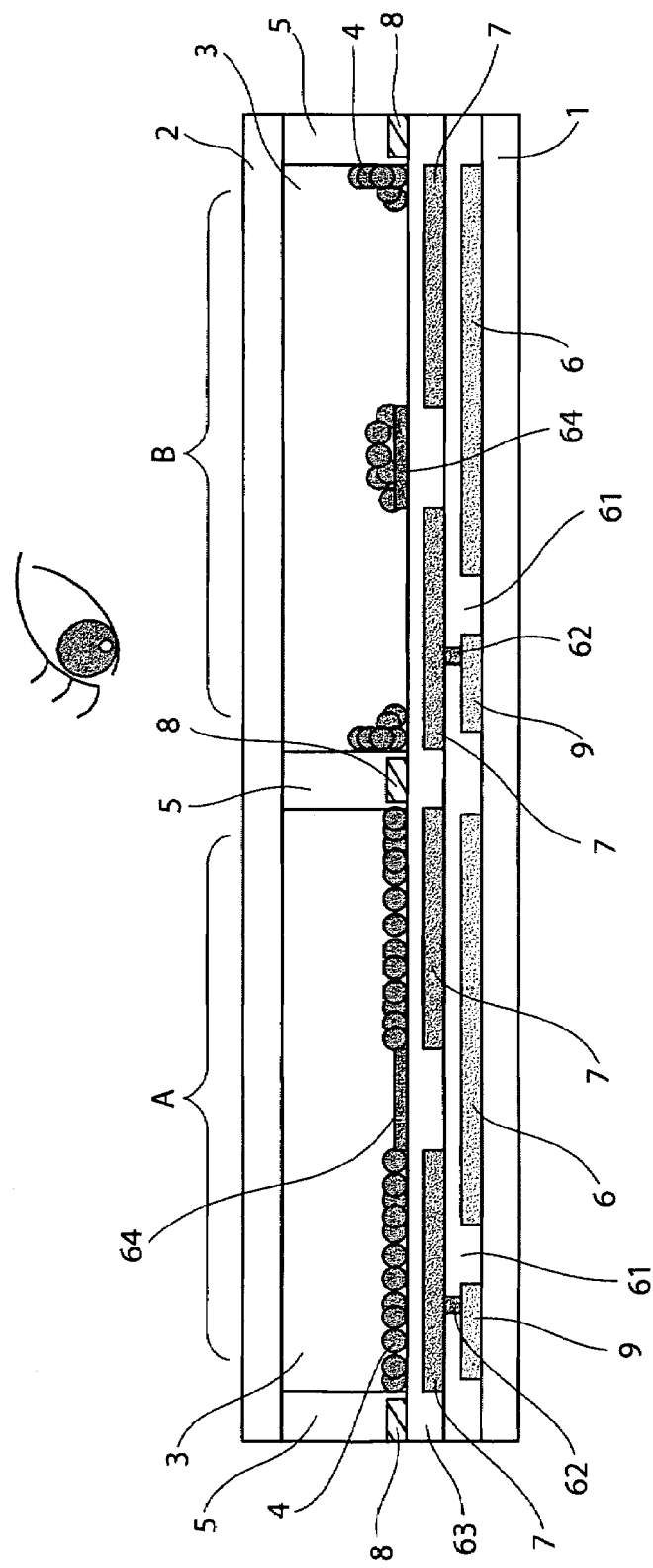

Also, as another structure, the partition wall electrode 8 may be formed on the side surface of the partition wall 5, as indicated in FIG. 2(b). Also, a dielectric layer 81 may preferably be formed on the surface of the partition wall electrode 8 in order to prevent electric charge from injecting in the charged electrophoretic particles. Further, as still another structure, the partition wall electrode 8 may be formed on the surface of the first substrate 1 that is a bottom surface of the partition wall 5, as indicated in FIG. 2(c).

Figure 3:
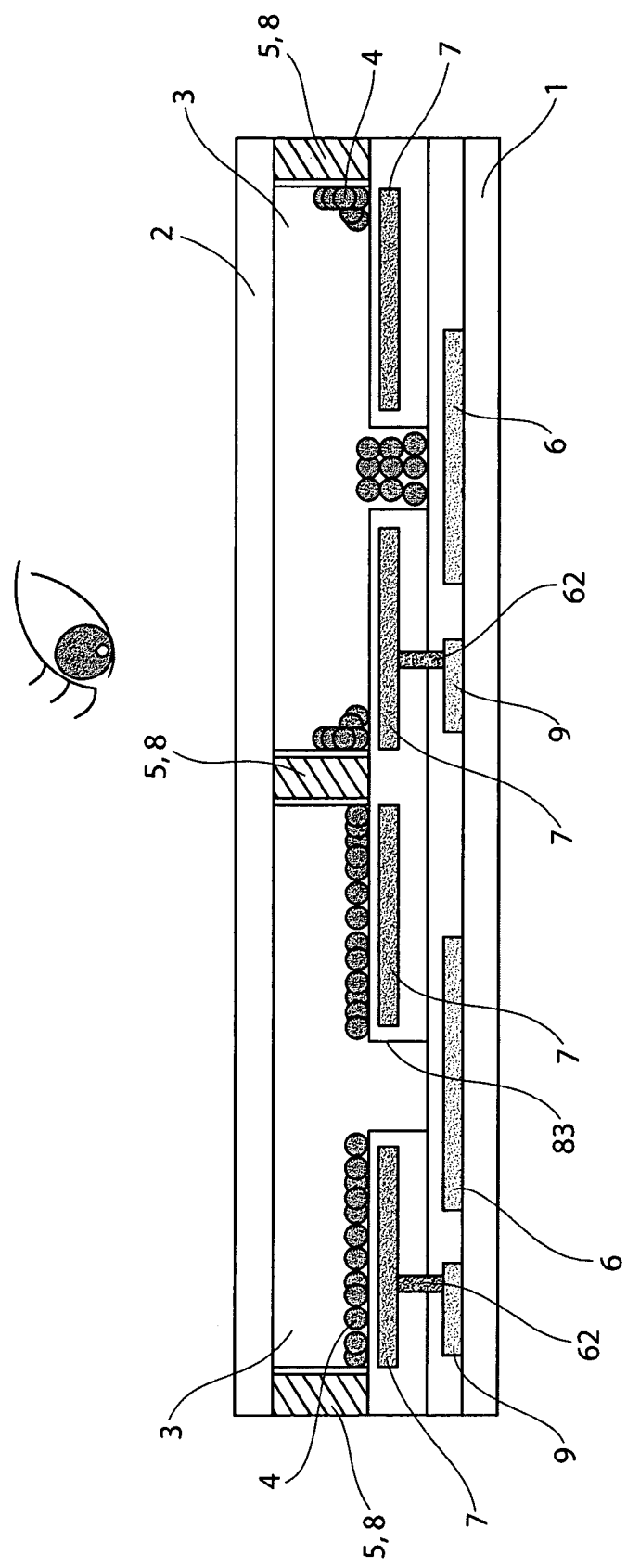
FIG. 3 shows a representative cross-sectional view of an example of a display device in accordance with another embodiment of the present invention.

As still another structure, a step difference 83 may be disposed at a boundary section between the collector electrode 6 and the display electrode 7, as indicated in FIG. 3. With this structure, more charged electrophoretic particles can be stored in a three-dimensional space that is formed by the collector electrode 6 and the step difference 83. As a result, a greater difference in surface area can be set between the collector electrode and the display electrode, such that the display contrast can be improved.

Furthermore, the collector electrode in accordance with the present embodiment is not limited to the structure provided in the electrophoretic display device shown in FIG. 1. As indicated in FIG. 4(a), the collector electrode 6 may be formed in a shape that heaves up to the side of the second substrate 2. The heaved configuration of the collector electrode 6 can enhance the electric field adjacent to the collector electrode 6, make the migration of the charged electrophoretic particles more smooth, and further lower the driving voltage.

Also, the heaved configuration of the collector electrode 6 is not limited to the one indicated in FIG. 4(a). For example, the heaved configuration can be columnar as indicated in FIG. 4(b). The heaved configurations indicated in FIGS. 4(a) and 4(b) may preferably have a minimum height of 0.5 μm or greater, and more preferably 2 μm or greater. The maximum height of heaved configurations may vary depending on the distance between the substrates (i.e., the "inter-substrate distance"), and may preferably be ⅗ or less of the inter-substrate distance.

In accordance with the present invention, any one of a variety of different plan configurations may be applicable to the collector electrode. FIGS. 6(a), 6(b) and 6(c), and FIGS. 7(a), 7(b) and 7(c) shows plan views of representative examples of plan configurations of the collector electrode, and are views of any one of the collector electrodes whose cross sections are shown in FIGS. 1 through 5, as viewed from the display panel side.

Figure 6A:
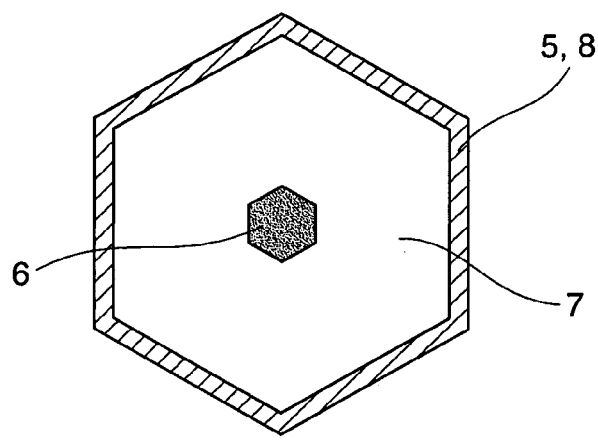
FIGS. 6(a), 6(b) and 6(c) show representative plan views of display devices in accordance with embodiments of the present invention.
Figure 6B:
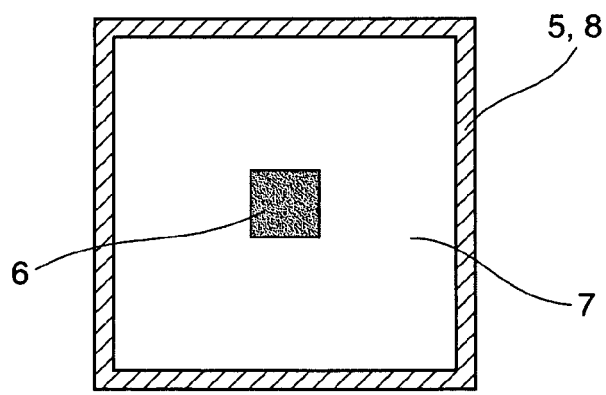
Figure 6C:
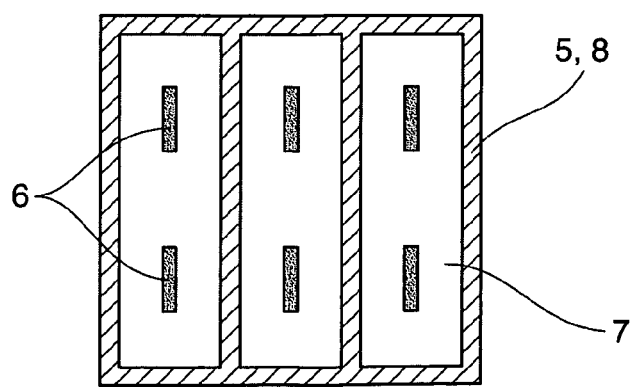
Figure 7A:
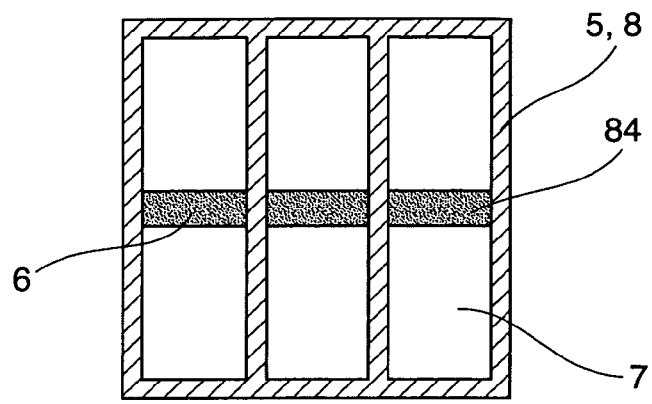
FIGS. 7(a), 7(b) and 7(c) show representative plan views of examples of display devices in accordance with other embodiments of the present invention.
Figure 7B:
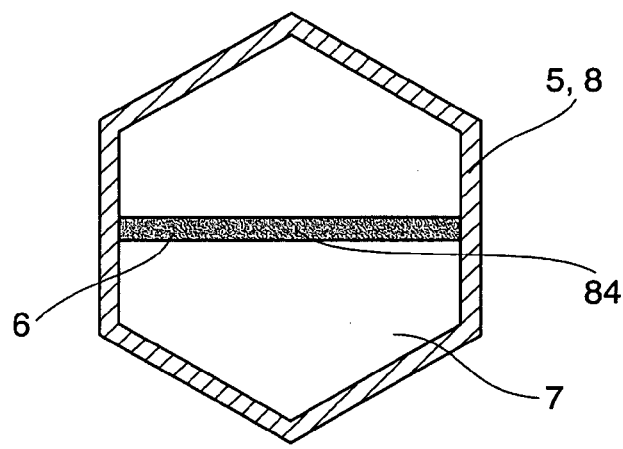
Figure 7C:
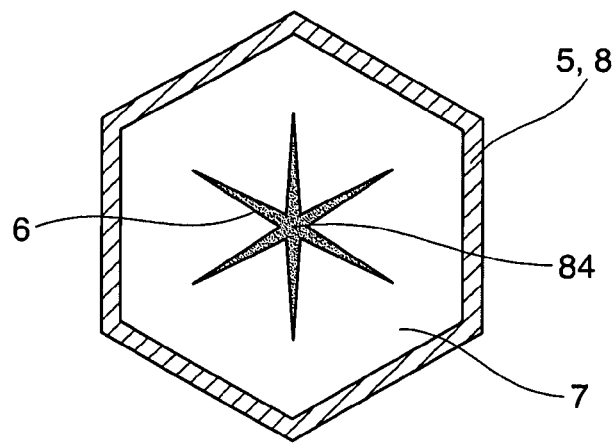

FIGS. 6(a) and 6(b) show the display electrode 7 that are in a regular hexagon and a square, respectively, and define pixels in a regular hexagon and a square, respectively. The partition walls 5 are disposed to surround the pixel. An aperture in a shape similar to the shape of the pixel is provided in the display electrode 7 at the center of the pixel, and the collector electrode 6 is disposed in the aperture. Although not shown, the collector electrode 6 can be extended under the display electrode 7. The aperture may not necessarily be in a figure similar to that of the pixel, and the collector electrode 6 may preferably be spaced generally equidistant from the partition wall electrodes 5 that surround the collector electrode 6. FIG. 6(c) shows an example in which the pixel is in an oblong configuration. This configuration may be used, for example, in a color display apparatus in which R/G/B pixels are disposed side by side. Two collector electrodes 6 are disposed in each pixel, and each of the collector electrodes 6 is in an oblong configuration whose longer sides extends in the same direction as that of the pixel, such that each of the collector electrodes 6 is spaced generally equidistant from the partition wall electrodes. FIGS. 6(a) through 6(c) show examples in which the collector electrode is disposed at a position generally equidistant from the partition wall electrodes. However, in order to create the effects of the invention, the collector electrode only needs to be provided to reinforce the electric field at least in places farthest from the partition walls, and needs not necessarily be equidistant from the partition walls. FIGS. 7(a) through 7(c) show examples in which a collector electrode is provided in an area that includes the center of the pixel which is located farthest from the partition walls, and extends in elsewhere from the center of the pixel.

The pixel shown in FIG. 7(a) has the same pixel configuration as that of the pixel shown in FIG. 6(c). Since the electric field of the partition wall electrodes 8 becomes weakest at a center 84 of the pixel, the collector electrode 6 is provided in areas including the center of the pixel and extended sideways. The extended direction and shape of the collector electrode 6 are determined to provide the collector electrode 6 with a sufficient width or an area with which the charged electrophoretic particles can readily gather, and the collector electrode 6 is divided in a manner to divide the pixel into two equal segments in order to minimize as much as possible the difference between the maximum value of the electric field and the minimum value thereof.

The pixel shown in FIG. 7(b) has the same pixel configuration as that of the pixel shown in FIG. 6(a). The collector electrode 6 is provided in areas including the center of the pixel and in a manner to divide the pixel in two equal segments. The same effects as described above can be obtained with this electrode structure. Since the pixel in this example is in a regular hexagon, the configuration of the collector electrode 6 can be decided to divide the pixel into three or six equal segments. FIG. 7(c) shows an example in which the pixel is divided into six equal segments.

Figure 8A:
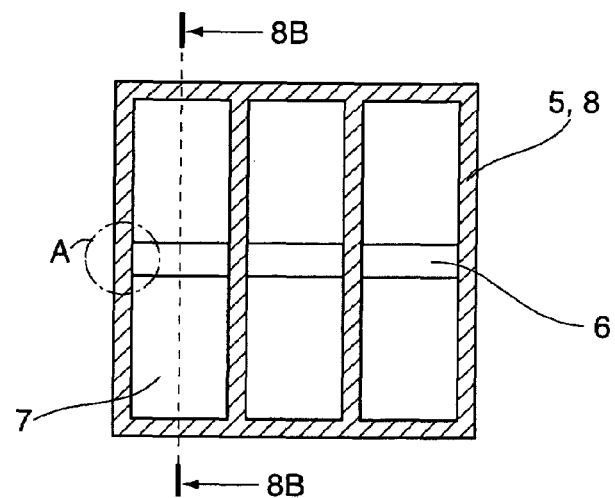
FIGS. 8(a) and 8(b) show a plan view and a cross-sectional view of a representative structure of a display device in accordance with an embodiment of the present invention.
Figure 8B:
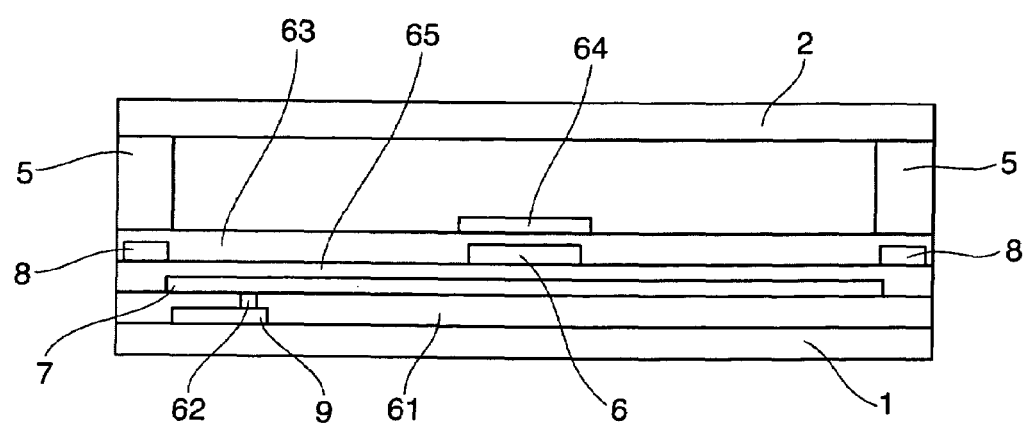
Figure 9A:
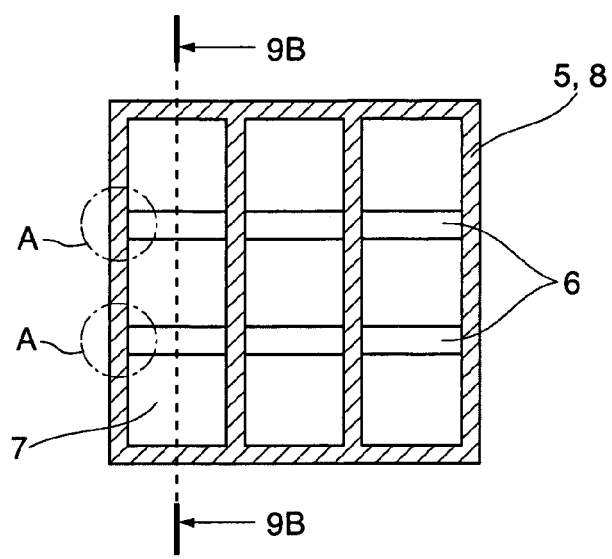
FIGS. 9(a) and 9(b) show a plan view and a cross-sectional view of a representative structure of a display device in accordance with another embodiment of the present invention.
Figure 9B:
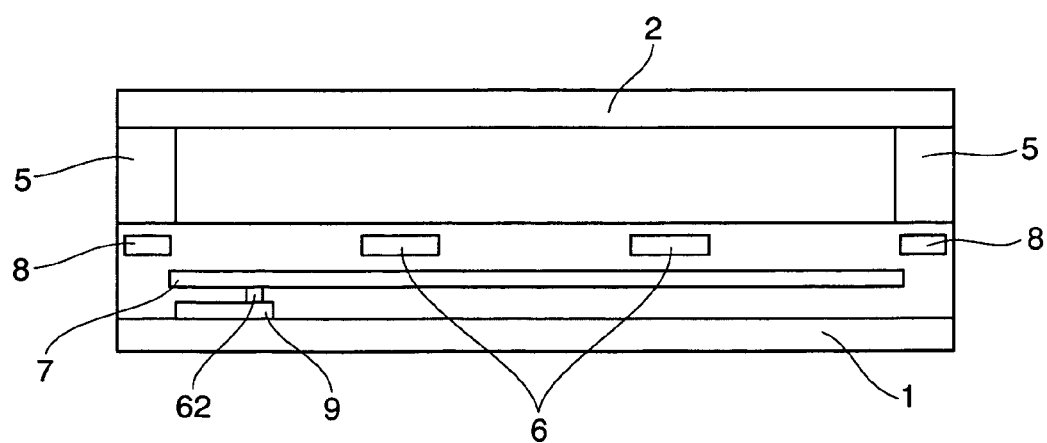

FIGS. 8(a) and 8(b) and FIGS. 9(a) and 9(b) show other configurations in which the collector electrodes 6 and the partition wall electrodes 5 are formed in one piece. FIG. 8(a) and FIG. 9(a) are plan views of the pixels, and FIG. 8(b) and FIG. 9(b) are cross-sectional views of the pixels taken along lines 8B-8B and 9B-9B, respectively, of the corresponding plan views. In the collector electrodes shown in FIGS. 8(a) and 8(b) and FIGS. 9(a) and 9(b), the collector electrode 6 and the partition wall electrode 5 are connected in a unitary fashion in a region where the collector electrode 6 and the partition wall electrode 5 overlap one another, such as a region A. In this case, since the collector electrode and the partition wall electrode can be formed at once, the manufacturing process can be simplified.

Figure 10:
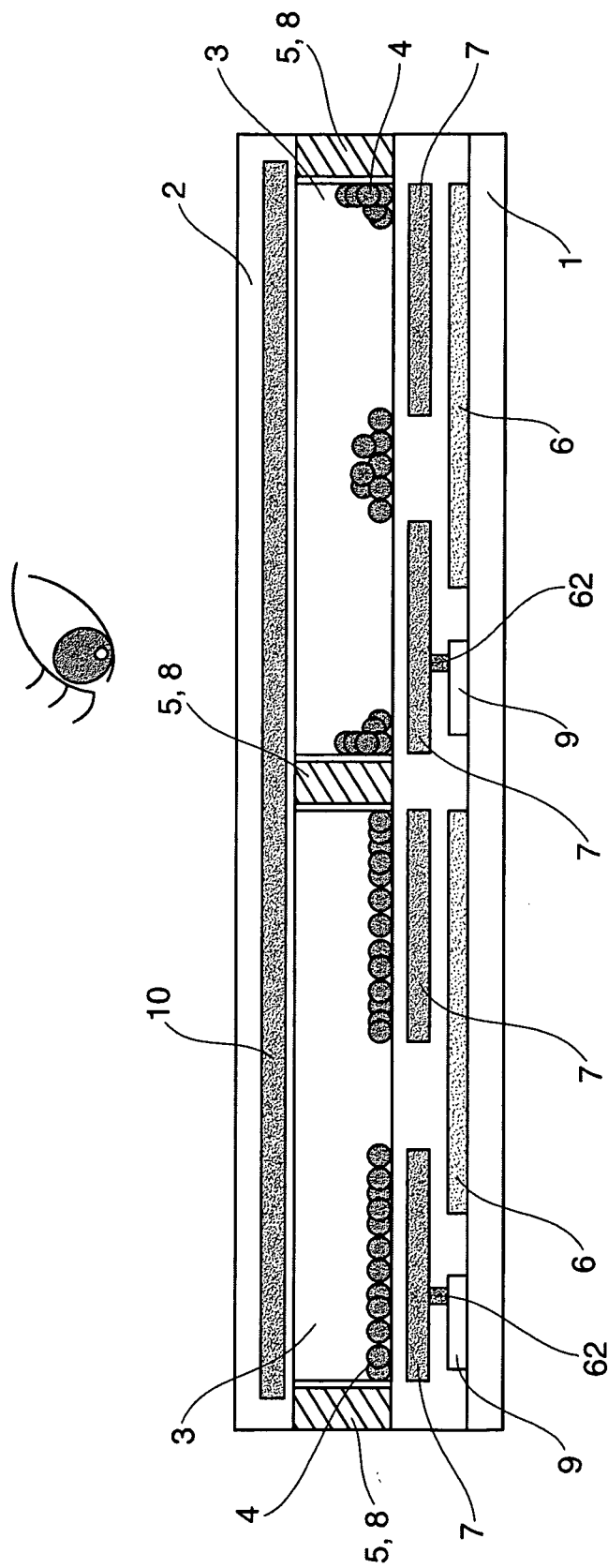
FIG. 10 shows a representative cross-sectional view of a display device in accordance with another embodiment of the present invention.
Figure 12:
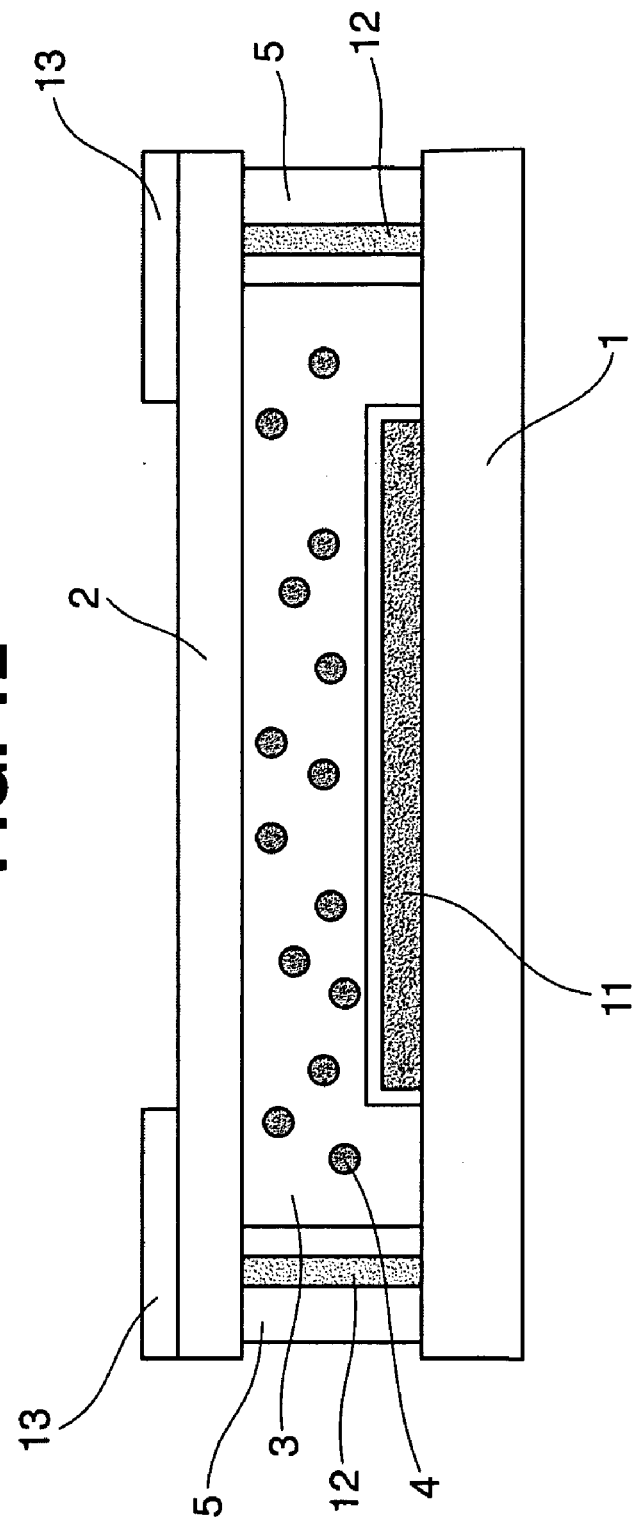
FIG. 12 shows a cross-sectional view of an example of a conventional display device.

FIG. 10 shows a still another structure example in which a fourth electrode 10 is provided on the second substrate 2. When the charged electrophoretic particles migrate toward the second substrate 2, and stick to the surface of the second substrate 2, the display contrast is deteriorated. To suppress this phenomenon, a voltage having the same polarity as that of the charged electrophoretic particles may be applied to the fourth electrode 10. As a result, the migration of the charged electrophoretic particles toward the second substrate 2 can be prevented. For example, when the charged electrophoretic particles are charged in a positive polarity, a voltage in the same polarity, i.e., a positive polarity is applied to the fourth electrode 10, such that the migration of the charged electrophoretic particles toward the second substrate 2 is suppressed.

Next, members that compose the electrophoretic display device in accordance with an embodiment of the present invention will be described.

Each of the first substrate 1 and the second substrate 2 may be formed from a polymer film, such as, for example, a polyethylene terephthalate (PET) and polyethersulfone (PES), or an inorganic material, such as, for example, a glass and a quartz.

Also, any conductive material can be used for the collector electrode 6, the display electrode 7 and partition wall electrode 8. For example, metal such as titanium (Ti), aluminum (Al), gold (Au), copper (Cu) or the like, carbon, silver paste, conductive high polymer material, conductive resist, indium tin oxide (ITO) can be used. When the display electrode is also used as a light reflection layer, a material having a high index of reflection such as silver (Ag), aluminum (Al) or the like may preferably be used. When the display electrode is used for displaying white color, the surface of the electrode may be roughened to irregularly reflect light, or a light dispersion layer may be formed on the surface of the electrode. As the dielectric liquid, colorless, transparent liquid, such as, for example, isoparaffin, silicon oil, toluene, xylene, high-purity kerosene or the like may be used. As the charged electrophoretic particles, any material that shows a good charge characteristic in dielectric liquid can be used. For example, resin such as polyethylene and polystyrene may preferably be used. When the charged electrophoretic particles are colored in black, the resin particles can be mixed with carbon, for example. The particle size of the charged electrophoretic particles 3 is not limited to any particular size, but may preferably be about 0.5 µm–10 µm.

Next, one example of a driving method to be applied to the electrophoretic display device in accordance with the present embodiment will be described. The collector electrodes 6 and the partition wall electrodes 8 are grounded as a common electrode for the entire pixels, and a driving voltage is applied to the display electrode 7 of each of the pixels, such that the charged electrophoretic particles charged in a positive polarity or a negative polarity can be migrated. When the charged electrophoretic particles are moved to a position where the charged electrophoretic particles cover the display electrode, the color of the charged electrophoretic particles and the collector electrode can be visually recognized through the transparent dielectric liquid (in the case of the pixel A in FIG. 1). When the charged electrophoretic particles that cover the surface of the display electrode are moved to the surface of the collector electrode and to the side surface of the partition walls and their adjacent areas, the color of the display electrode can be mainly visually recognized (in the case of the pixel B in FIG. 1).

In the display device, in accordance with the present embodiment, because a transparent dielectric liquid is used as a dispersion medium, an electrophoretic display device capable of an excellent stable display in high contrast can be provided.

Also, in accordance with the present embodiment, among the charged electrophoretic particles on the display device, the charged electrophoretic particles in a region adjacent to the partition wall are mainly migrated between the display electrode surface and the partition wall surface and its adjacent area, and the charged electrophoretic particles in a region that is not adjacent to the partition wall are mainly migrated between the display electrode surface and the collector electrode surface. This almost entirely eliminates a region within the pixel where the charged electrophoretic particles are difficult to migrate due to weak electric field. As a result, the driving voltage can be lowered without deteriorating the contrast.

When an active matrix driving method is employed in the present invention, a switching element, a wiring connected to the switching element, or wirings connected to various electrodes, or all of the above may preferably be disposed at positions where the switching element and/or the wirings are shielded by one or both of the display electrode surface and the collector electrode surface, and where they do not electrically affect the regions where the charged electrophoretic particles are present. By so doing, the influence of leak electric fields from the switching element and wirings to the charged electrophoretic particles can be suppressed.

Furthermore, the display electrode and the collector electrode in accordance with the present embodiment may be disposed such that portions of the display electrode and the collector electrode are overlapped each other in a direction in parallel with the first substrate. As a result, the display panel is provided with a greater electric capacity. For this reason, when an active matrix driving method that uses switching elements is employed, the need to additionally form independent larger auxiliary electric capacities is obviated.

Furthermore, since the partition wall electrode that has a conductivity is disposed between adjacent pixels, a leak of the electric field from one pixel to the other adjacent pixel can be reduced. As a result, charged electrophoretic particles disposed in each of the pixels can be controlled only by a voltage that is applied to the electrode of that pixel (without being influenced by voltages applied to electric fields of other adjacent pixels). In other words, the shield effect provided by the partition wall electrode achieves a stable display without causing a display disturbance or a lowered contrast in each of the pixels.

More specific examples of the embodiments of the present invention will be described below.

(Embodiment Example 1)

In accordance with an embodiment example 1, an electrophoretic display device having the structure indicated in FIG. 1 is manufactured. For the sake of simplicity, the following description may be made with reference to a method for manufacturing a single electrophoretic display device for each pixel or two adjacent pixels. However, it is obvious that a plurality of electrophoretic display devices can be manufactured at the same time.

In the display device of the embodiment example 1, each pixel has a size of 120 µm×120 µm, an area ratio between the collector electrode 6 and the display electrode 7 is 2:8, and the partition wall 5 has a width of 5 µm.

A glass substrate (1.1 mm thick) is used as the first substrate 1, and a switching element 9, other wirings needed for driving (not shown), an IC, and a collector electrode 6 are formed on the first substrate 1.

Next, a $Si_3N_4$ film as a dielectric layer 61 is formed over the entire surface of the first substrate. At the same time, a contact hole 62 for making an electrical contact between the switching element 9 and a display electrode to be formed later is formed in the dielectric layer 61.

Next, an aluminum (Al) film as a display electrode is formed over the dielectric layer, and patterned by a photolithography method or a wet etching method to form a display electrode 7. When the Al film is formed, the switching element 9 and the display electrode 7 become conductive via the contact hole 62.

Then, a white colored layer 63 is coated over the entire surface. The white colored layer is composed of an acrylic resin containing white pigments of titanium oxide, alumina or the like dispersed therein. Then, a dark black colored layer 64 is formed over the collector electrode 6.

Next, partition wall electrode 8 composed of a conductive material are formed by a plating process, and dielectric layers 81 are formed on surfaces of the partition wall electrodes 8. In this example, the width of the partition wall 5 (=the partition wall electrode 8 in the embodiment example) is 5 µm and its height is 20 µm.

Next, a dielectric liquid 3 and charged electrophoretic particles 5 are filled in spaces formed inside the partition walls. Isoparaffins (Isopar, available from Exxon Mobil Corporation) is used as the dielectric liquid, and a polystyrene-polymethyl methacrylate copolymer resin containing carbon blacks having a particle size of about 1–2 µm are used as the charged electrophoretic particles. A succinimide (OLOA 1200, available from Chevron Chemical Company) is added as a charge controlling agent in the isoparaffins. The charged electrophoretic particles 3 has a positive charge.

Finally, a second substrate 2 is disposed on the partition walls.

Display operations were conducted, using the electrophoretic display device thus manufactured, and its display characteristics were measured. More specifically, the collector electrodes and the partition walls were used as a common electrode for the entire pixels, an application voltage to the common electrode was set at 0 V, and an application voltage to the display electrode of each pixel was varied in a range of ±15V. As a result, a good white and black display characteristic was obtained in a stable manner. Furthermore, even when adjacent pixels are displayed in black and white differently from one another, no change in their contrast was observed, and it was confirmed that a stable display contrast was obtained.

(Embodiment Example 2)

In accordance with an embodiment example 2, an electrophoretic display device having the structure indicated in FIG. 2(*b*) is manufactured.

In the display device of the embodiment example 2, each pixel has a size of 200 µm×200 µm, an area ratio between the collector electrode 6 and the display electrode 7 is 2:8, and the partition wall 5 has a width of 7 µm.

A stainless foil substrate (260 µm thick) is used as the first substrate 1, and a switching element 9, other wirings needed for driving (not shown), an IC, and a collector electrode 6 are formed on the first substrate 1.

Next, an acrylic resin layer as a dielectric layer 61 is formed over the entire surface of the first substrate. At the same time, a contact hole 62 for making an electrical contact between the switching element 9 and a display electrode to be formed later is formed in the dielectric layer 61.

Next, an aluminum (Al) film as a display electrode is formed over the dielectric layer, and patterned by a photolithography method or a wet etching method to form a display electrode 7. When the Al film is formed, the switching element 9 and the display electrode 7 become conductive via the contact hole 62.

Then, a white colored layer 63 is coated over the entire surface. The white colored layer is composed of an acrylic resin containing white pigments of titanium oxide, alumina or the like dispersed therein. Then, a dark black colored layer 64 is formed over the collector electrode 6.

Next, a photosensitive epoxy resin is coated on the entire surface, and is subjected to a photolithography method, thereby forming partition walls 5 each having a width of 5 µm and a height of 30 µm. Then, partition wall electrodes 8 composed of a conductive material are formed to a thickness of 0.5 µm on side surfaces of the partition walls, and then dielectric layers 81 composed of an acrylic resin are formed to a thickness of 1.5 µm on surfaces of the partition wall electrodes 8.

Next, a dielectric liquid 3 and charged electrophoretic particles 5 are filled in spaces formed inside the partition walls. Isoparaffins (Isopar, available from Exxon Mobil Corporation) is used as the dielectric liquid, and a polystyrene polymethyl methacrylate copolymer resin containing carbon blacks having a particle size of about 1–2 µm are used as the charged electrophoretic particles. A succinimide (OLOA 1200, available from Chevron Chemical Company) is added as a charge controlling agent in the isoparaffins. The charged electrophoretic particles 3 has a positive charge.

Finally, a second substrate 2 is disposed on the partition walls.

Display operations were conducted, using the electrophoretic display device thus manufactured, and its display characteristics were measured. More specifically, the collector electrodes were used as a common electrode for the entire pixels, and an application voltage to the collector electrodes was set at −5 V; also, the partition wall electrodes were used as a common electrode for the entire pixels, and an application voltage to the partition wall electrodes was set at 0 V. Furthermore, an application voltage to the display electrode of each pixel was set to +2 V for displaying in white, and was set to −10 V for displaying in black. An a result, a good white and black display characteristic was obtained in a stable manner. Furthermore, even when adjacent pixels are displayed in black and white differently from one another, no change in their contrast was observed, and it was confirmed that a stable display contrast was obtained.

(Embodiment Example 3)

In accordance with an embodiment example 3, an electrophoretic display device having the structure indicated in FIG. 2(*c*) is manufactured.

In the display device of the embodiment example 1, each pixel has a size of 130 µm×130 µm, an area ratio between the collector electrode 6 and the display electrode 7 is 2:8, and the partition wall 5 has a width of 7 µm.

A glass substrate (1.1 mm thick) is used as the first substrate 1, and a switching element 9, other wirings needed for driving (not shown), an IC, and a collector electrode 6 are formed on the first substrate 1.

Next, a $Si_3N_4$ film as a dielectric layer 61 is formed over the entire surface of the first substrate. At the same time, a contact hole 62 for making an electrical contact between the switching element 9 and a display electrode to be formed later is formed in the dielectric layer 61.

Next, an aluminum (Al) film as a display electrode is formed over the dielectric layer, and patterned by a photolithography method or a wet etching method to form a display electrode 7. When the Al film is formed, the switching element 9 and the display electrode 7 become conductive via the contact hole 62.

Then, a white colored layer 63 as a dielectric layer is coated to cover the entire surface. The white colored layer is composed of an acrylic resin containing white pigments of titanium oxide, alumina or the like dispersed therein. Then, a dark black colored layer 64 is formed over the collector electrode 6. An aluminum (Al) layer as partition wall electrodes is formed on the dielectric layer, and patterned by a photolithography method or a wet etching method, thereby forming partition wall electrodes 8 indicated in FIG. 2(c) having a width of 5 μm.

Next, a photosensitive epoxy resin is coated on the entire surface, and is subjected to a photolithography method, thereby forming partition walls 5 each having a width of 7 μm and a height of 15 μm.

Next, a dielectric liquid 3 and charged electrophoretic particles 5 are filled in spaces formed inside the partition walls. Isoparaffins (Isopar, available from Exxon Mobil Corporation) is used as the dielectric liquid, and a polystyrene-polymethyl methacrylate copolymer resin containing carbon blacks having a particle size of about 1–2 μm are used as the charged electrophoretic particles. A succinimide (OLOA 1200, available from Chevron Chemical Company) is added as a charge controlling agent in the isoparaffins. The charged electrophoretic particles 3 has a positive charge.

Finally, a second substrate 2 is disposed on the partition walls.

Display operations were conducted, using the electrophoretic display device thus manufactured, and its display characteristics were measured. More specifically, the collector electrodes were used as a common electrode for the entire pixels, and an application voltage to the collector electrodes was set at −5 V; also, the partition wall electrodes were used as a common electrode for the entire pixels, and an application voltage to the partition wall electrodes was set at 0 V. Furthermore, an application voltage to the display electrode of each pixel was set to +2 V for displaying in white, and was set to −10 V for displaying in black. As a result, a good white and black display characteristic was obtained in a stable manner.

(Embodiment Example 4)

In accordance with an embodiment example 4, an electrophoretic display device having the structure indicated in FIGS. 8(a) and 8(b) is manufactured.

In the display device of the embodiment example 1, each pixel has a size of 60 μm×180 μm, an area ratio between the collector electrode 6 and the display electrode 7 is 2:8, and the partition wall 5 has a width of 5 μm.

A glass substrate (1.1 mm thick) is used as the first substrate 1, and a switching element 9, other wirings needed for driving and an IC (not shown) are formed on the first substrate 1.

Next, a $Si_3N_4$ film as a dielectric layer 61 is formed over the entire surface of the first substrate. At the same time, a contact hole 62 for making an electrical contact between the switching element 9 and a display electrode to be formed later is formed in the dielectric layer 61.

Next, an aluminum (Al) film as a display electrode is formed over the dielectric layer, and patterned by a photolithography method or a wet etching method to form a display electrode 7. When the Al film is formed, the switching element 9 and the display electrode 7 become conductive via the contact hole 62.

Then, an acrylic resin layer as a dielectric layer 65 is formed over the entire surface. Then, an aluminum (Al) layer for forming collector electrode and partition wall electrode is formed on the dielectric layer, and patterned by a photolithography method or a wet etching method, thereby forming a collector electrode 6 and partition wall electrodes 8 in one piece, as shown in FIGS. 8(a) and 8(b).

Then, a white colored layer 63 as a dielectric layer is coated to cover the entire surface. The white colored layer is composed of an acrylic resin containing white pigments of titanium oxide, alumina or the like dispersed therein. Then, a dark black colored layer 64 is formed over the collector electrode 6.

Next, a photosensitive epoxy resin is coated on the entire surface, and then subjected to a photolithography method, thereby forming partition walls 5 each having a width of 5 μm and a height of 22 μm.

Next, a dielectric liquid 3 and charged electrophoretic particles 5 are filled in spaces formed inside the partition walls. Isoparaffins (Isopar, available from Exxon Mobil Corporation) is used as the dielectric liquid, and a polystyrene-polymethyl methacrylate copolymer resin containing carbon blacks having a particle size of about 1–2 μm are used as the charged electrophoretic particles. A succinimide (OLOA 1200, available from Chevron Chemical Company) is added as a charge controlling agent in the isoparaffins. The charged electrophoretic particles 3 has a positive charge.

Finally, a second substrate 2 is disposed on the partition walls.

Display operations were conducted, using the electrophoretic display device thus manufactured, and its display characteristics were measured. More specifically, the collector electrodes and the partition walls were used as a common electrode for the entire pixels, and an application voltage to the common electrode was set at 0 V; then, an application voltage to the display electrode of each pixel was set to +15 V for displaying in white, and was set to −10 V for displaying in black. As a result, a good white and black display characteristic was obtained in a stable manner.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An electrophoretic display device comprising:
    a first substrate and a second substrate disposed opposite each other;
    a dielectric liquid filled in a gap between the first substrate and the second substrate;
    a plurality of charged electrophoretic particles dispersed in the dielectric liquid;
    a first electrode and a second electrode disposed on the first substrate to define a pixel;
    a partition wall disposed on at least one of the first substrate and the second substrate between adjacent pixels to prevent migration of the charged electrophoretic particles between the adjacent pixels; and a third electrode disposed adjacent to the partition wall, wherein the charged electrophoretic particles divide and a portion migrate from a surface of the first electrode to a surface of the second electrode and another portion migrate to a side surface of the partition wall where the third electrode is disposed to expose the first electrode surface to exhibit a first display state and wherein the charged electrophoretic particles migrate in opposite directions from their position in the first display state to cover the first electrode surface to exhibit a second display state.

2. An electrophoretic display device according to claim 1, wherein the third electrode is disposed at least one of inside, on a side surface, on an upper surface and on a bottom surface of the partition wall.

3. An electrophoretic display device according to claim 1, wherein the third electrode forms at least a part of the partition wall.

4. An electrophoretic display device according to claim 3, wherein the third electrode entirely forms the partition wall.

5. An electrophoretic display device according to claim 1, wherein the first electrode defines a circumference of each pixel, and the second electrode is disposed inside the first electrode.

6. An electrophoretic display device according to claim 1, wherein the second electrode is disposed at a location including a center of each pixel.

7. An electrophoretic display device according to claim 1, wherein the second electrode is disposed at a location that divides each pixel into equal segments.

8. An electrophoretic display device according to claim 1, wherein the second electrode is disposed at a location that divides each pixel into two equal segments.

9. An electrophoretic display device according to claim 1, wherein the second electrode is disposed at a location that divides each pixel into four equal segments.

10. An electrophoretic display device according to claim 1, wherein the second electrode is disposed at a location that divides each pixel into six equal segments.

11. An electrophoretic display device according to claim 1, wherein the third electrode is shared by two adjacent pixels that interpose the partition wall.

12. An electrophoretic display device according to claim 11, wherein the third electrode is a common electrode for a plurality of pixels.

13. An electrophoretic display device according to claim 1, wherein the second electrode and the third electrode are formed in one piece.

14. An electrophoretic display device according to claim 1, wherein the charged electrophoretic particles cover the surface of the first electrode in a first state, and the charged electrophoretic particles are divided and collected at the surface of the second electrode and the surface of the partition wall and an adjacent area of the partition wall in a second state different from the first state.

15. An electrophoretic display device according to claim 14, wherein the first electrode is set to a potential according to a specified display, and the second electrode and the third electrode are set at a common potential.

16. An electrophoretic display device according to claim 15, wherein each of the second electrode and the third electrode is set at a common potential for a plurality pixels.

17. An electrophoretic display device according to claim 1, further comprising a switching element connected to the first electrode for each pixel.

18. An electrophoretic display device according to claim 17, wherein the switching element is formed on the first substrate and in a layer below the surface of the first electrode, and the second electrode is provided extending between a layer in which the first electrode is formed and a layer in which the switching element is formed.

19. An electrophoretic display device according to claim 18, wherein the switching element is disposed at a position that is shielded by electrode surfaces of at least one of the first electrode and the second electrode from a region where the charged electrophoretic particles exist, and does not electrically influence the region.

20. An electrophoretic display device according to claim 18, wherein parts of the first electrode and the second electrode overlap each other through a dielectric layer.

21. An electrophoretic display device according to claim 1, further comprising a fourth electrode disposed on the second substrate in a portion opposite to the first electrode.

* * * * *